Patented Oct. 19, 1943

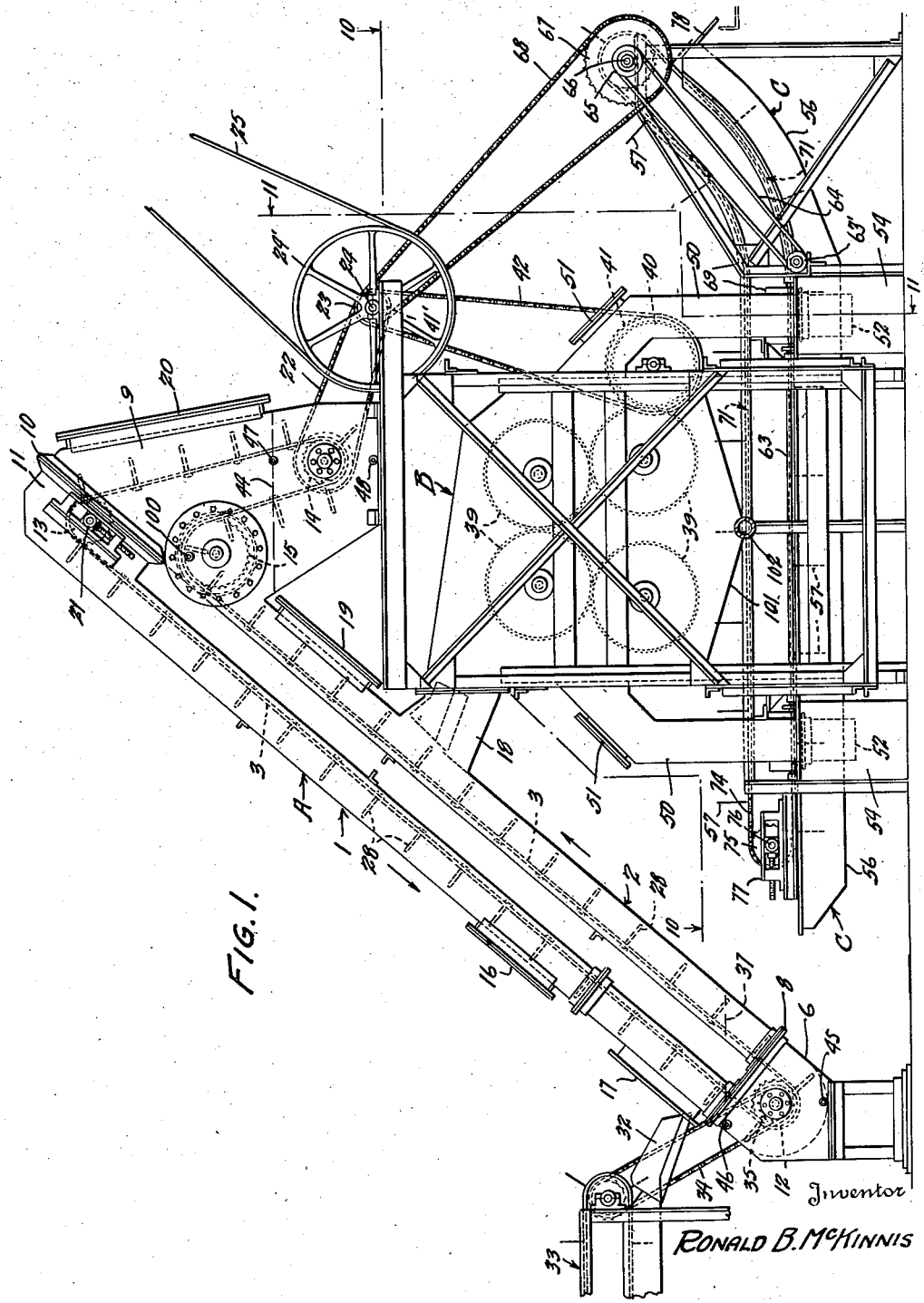

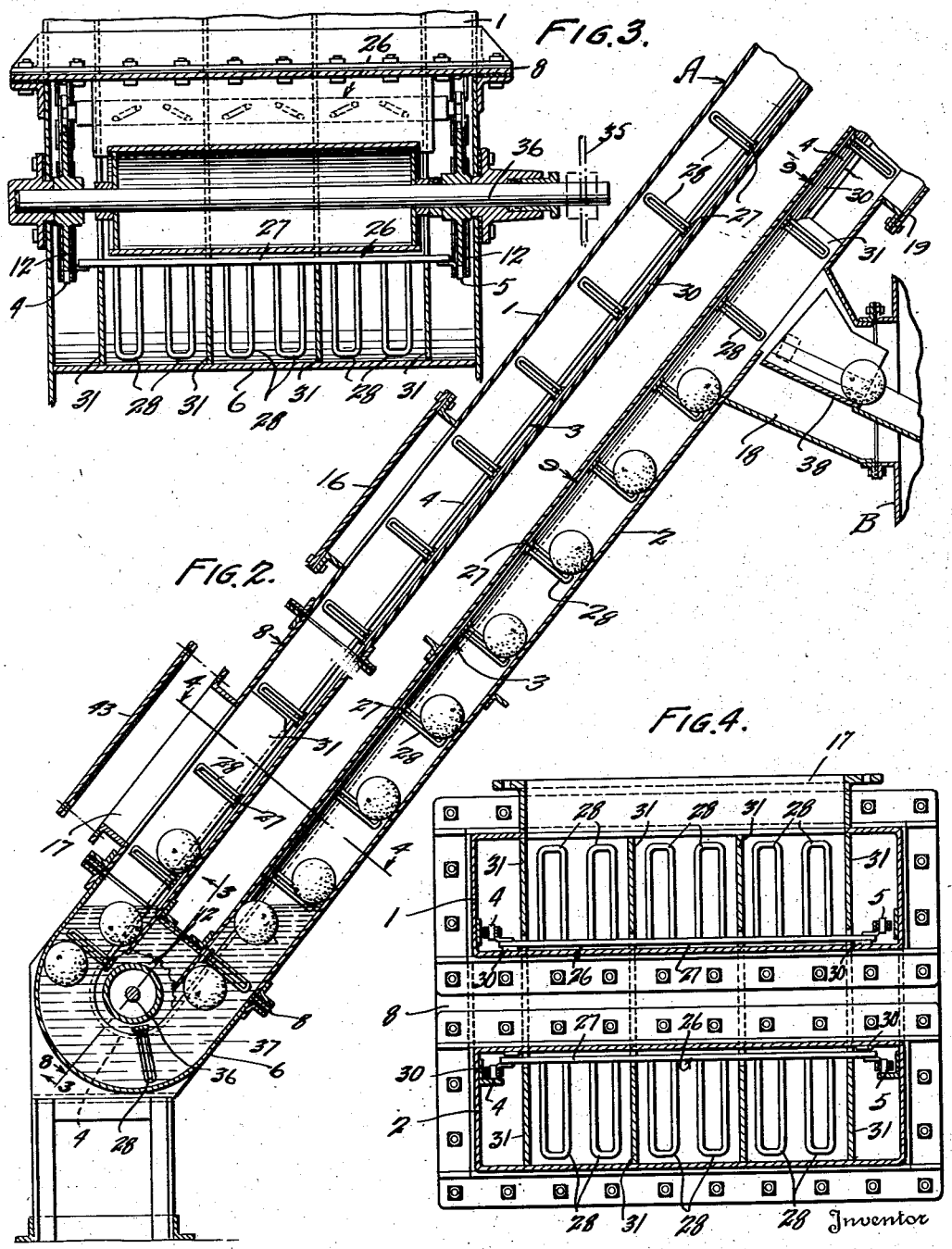

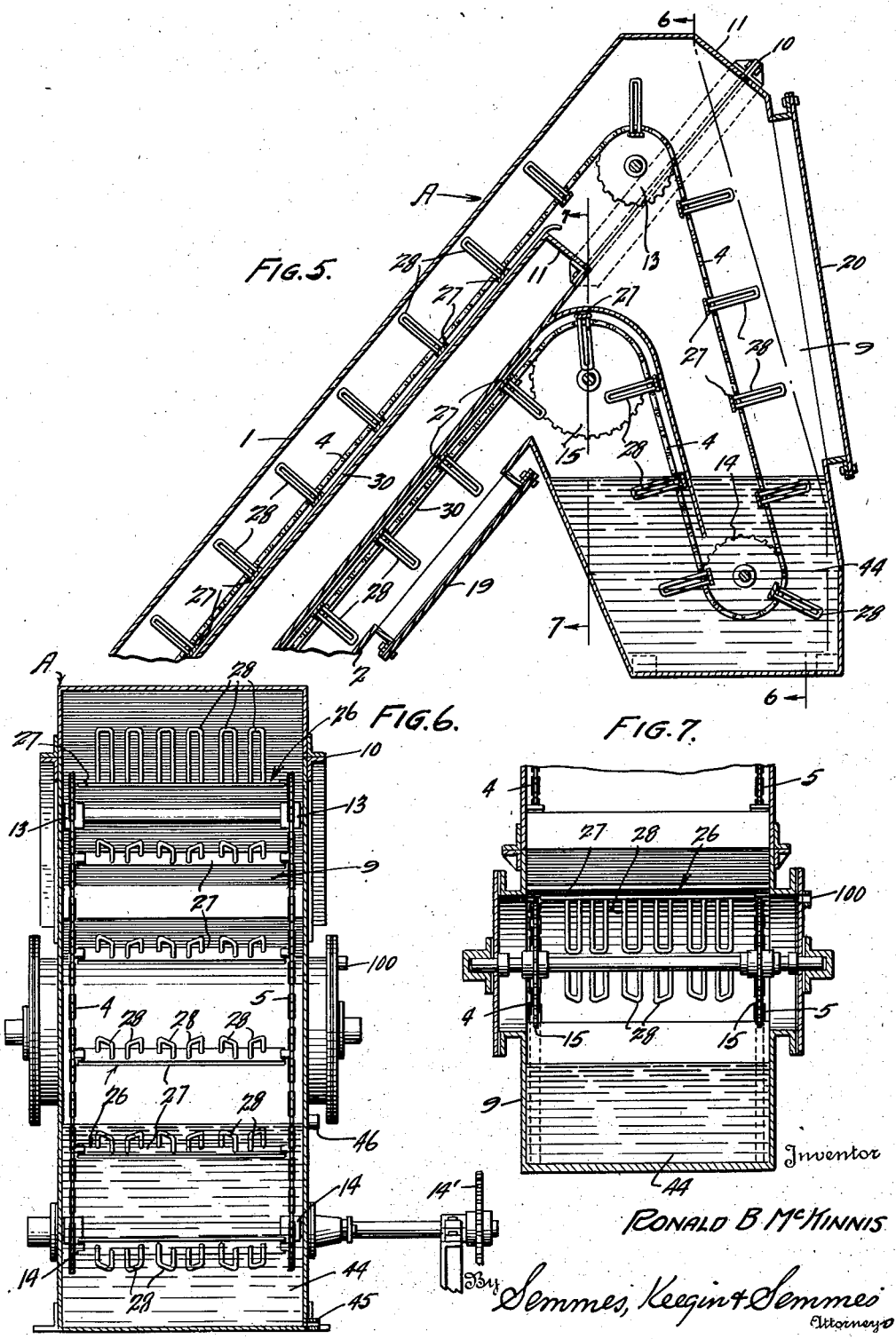

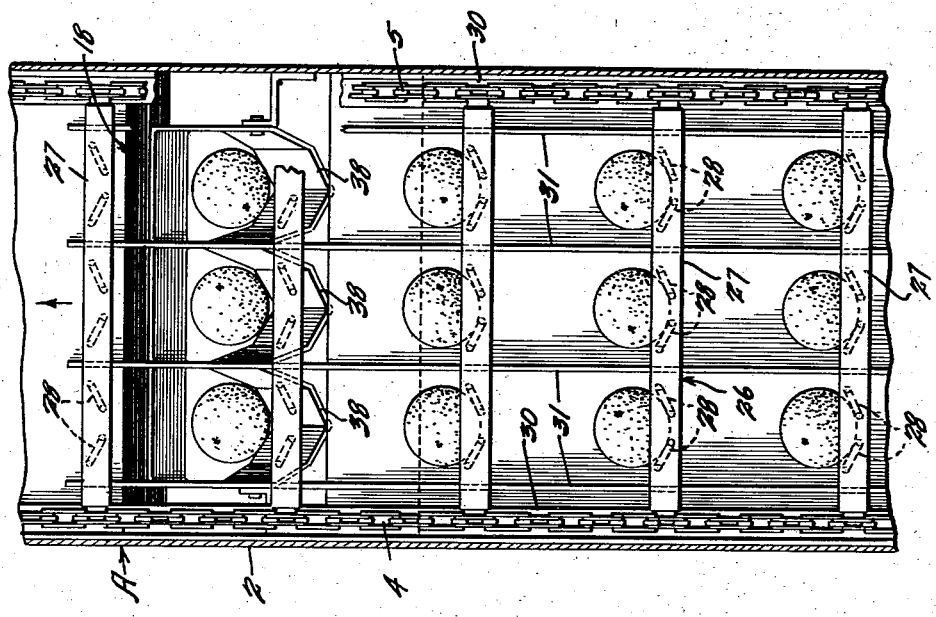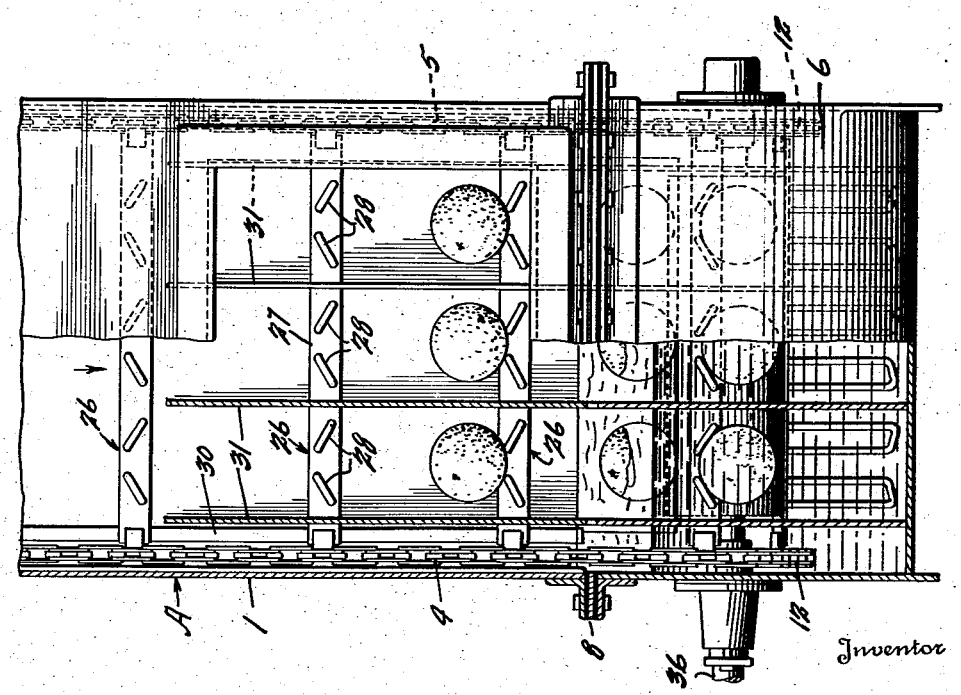

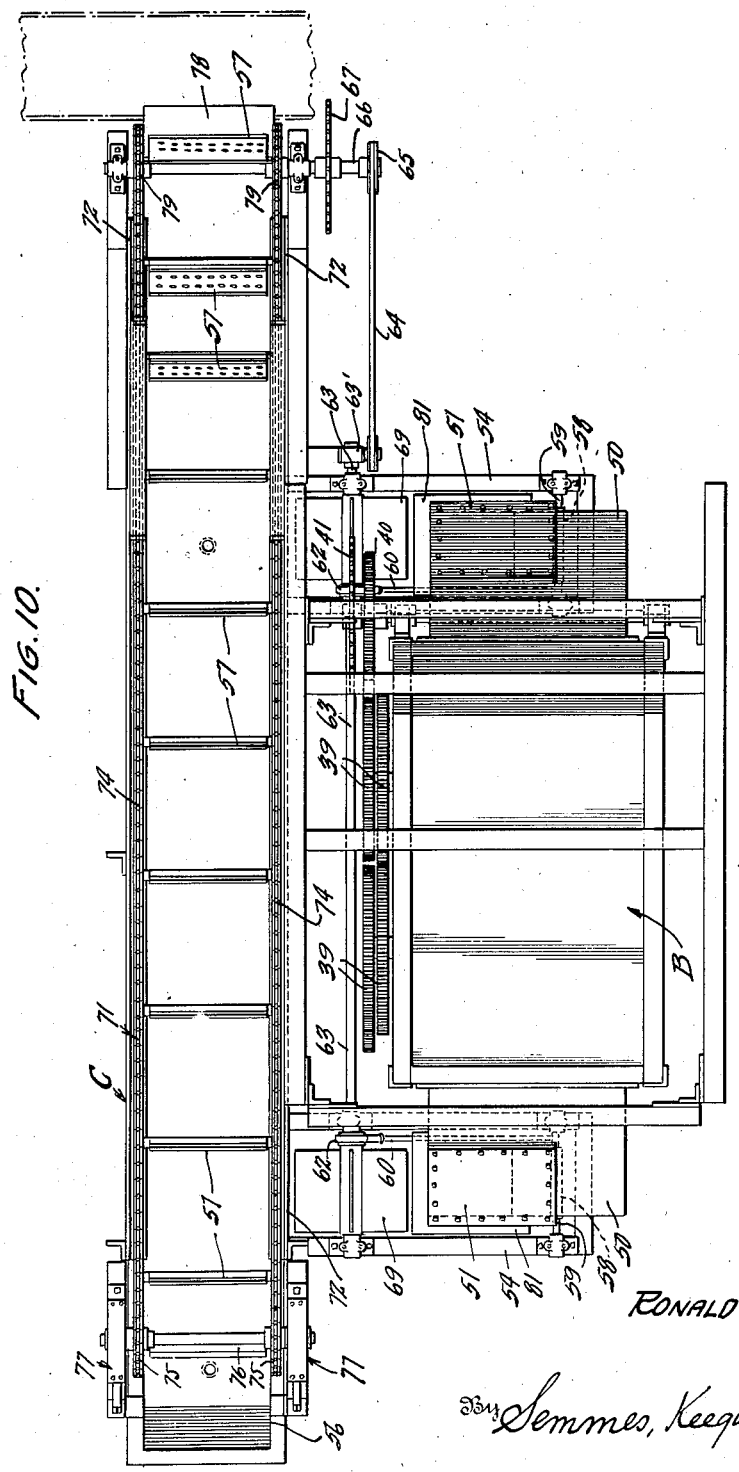

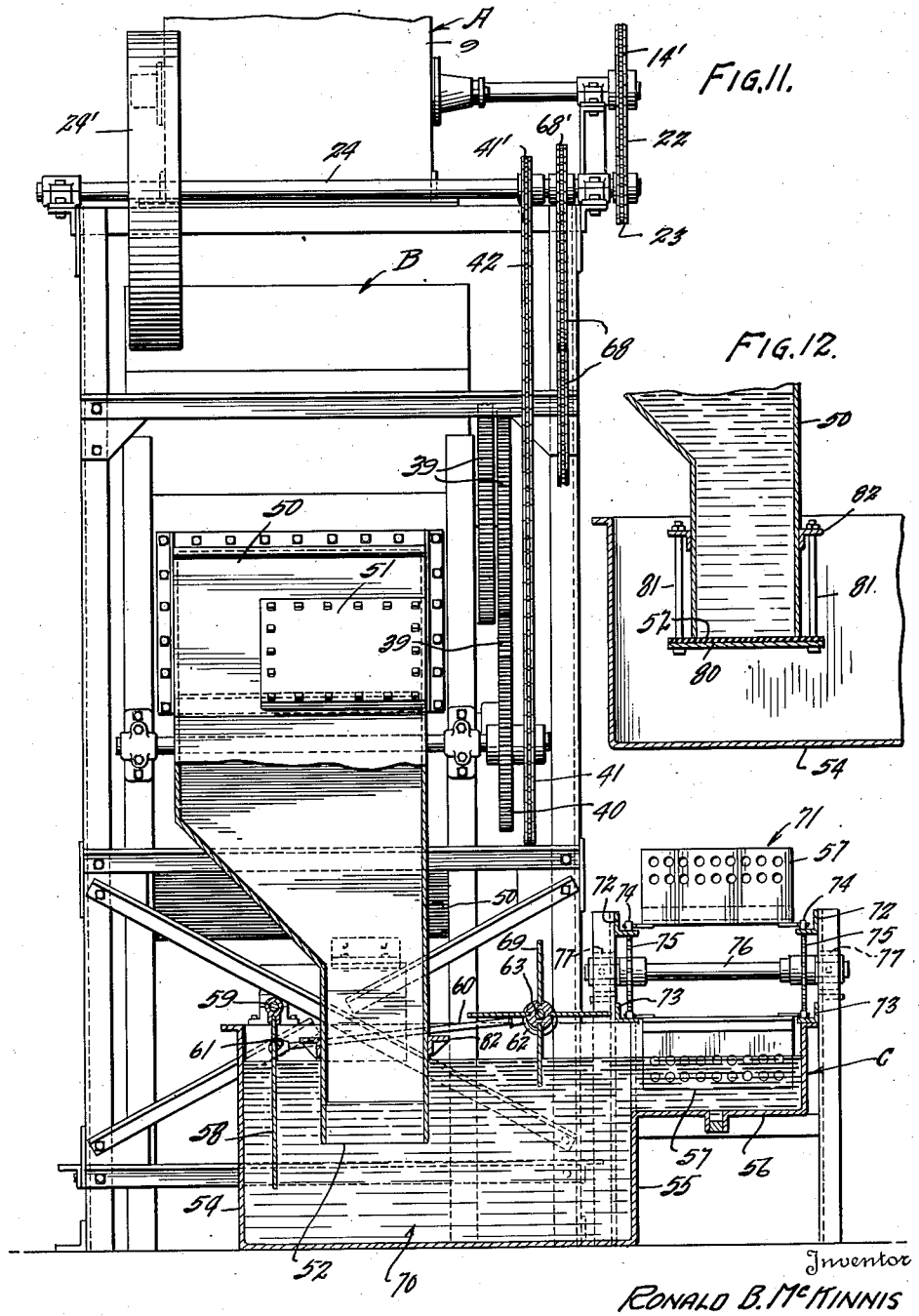

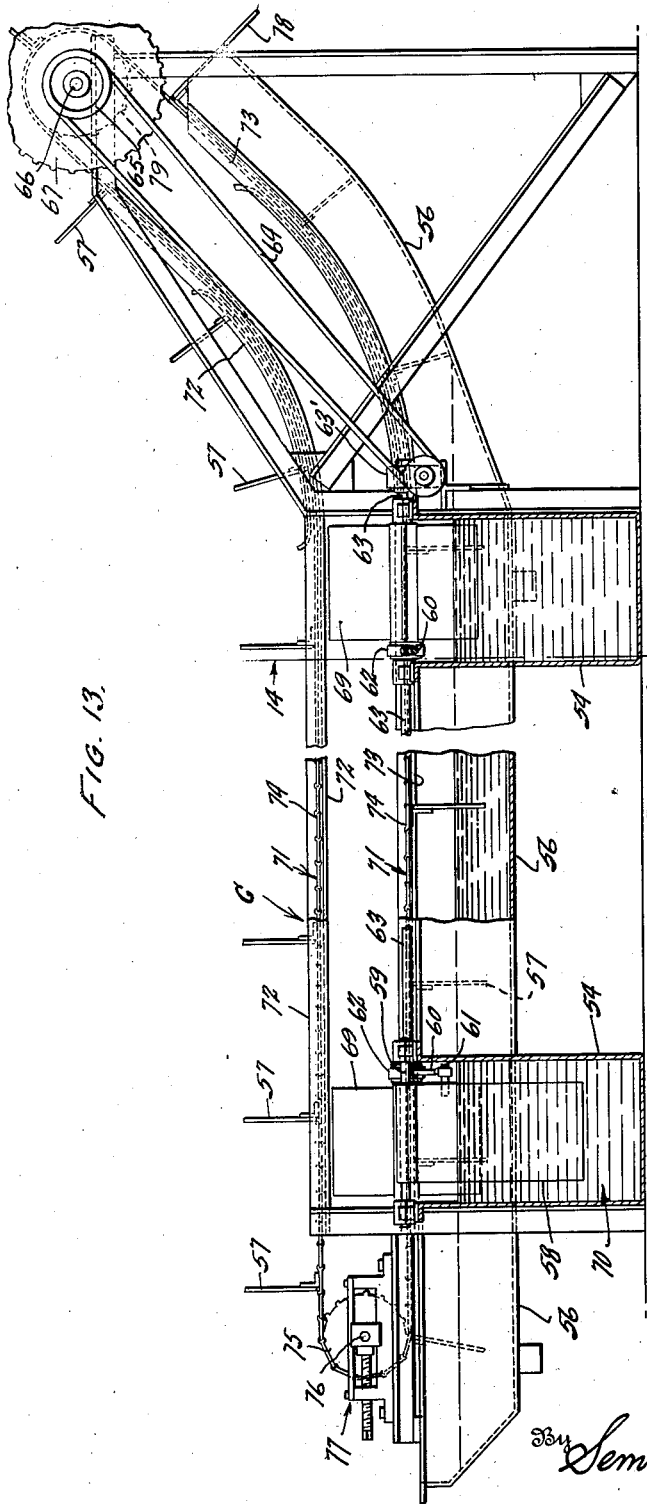
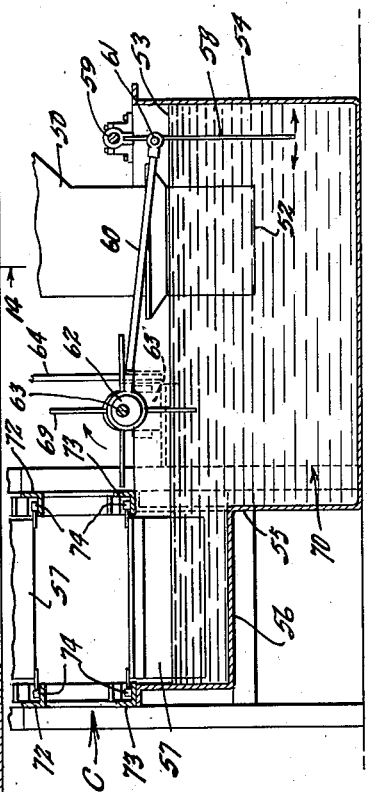

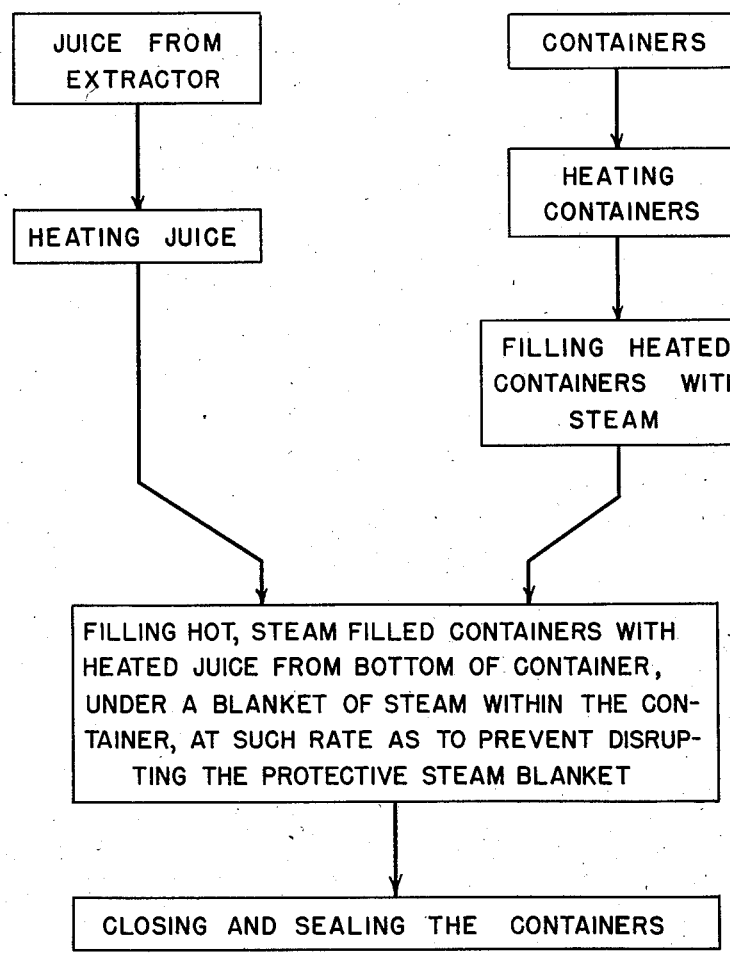

2,332,098

UNITED STATES PATENT OFFICE 2,332,098

TREATMENT OF FRUIT AND VEGETABLE JUICES

Ronald B. McKinnis, Winter Haven, Fla., assignor, by mesne assignments, to Ronald B. McKinnis, doing business as McKinnis Foods, Winter Haven, Fla.

Original application October 7, 1939, Serial No. 298,464. Divided and this application June 8, 1940, Serial No. 339,546

4 Claims. (Cl. 99—155)

My invention relates to a method and apparatus for extracting fruit and vegetable juices. It is particularly applicable to the extraction of juice from citrous fruits, but has application to other fruits, as well as vegetables.

This application is a division of my co-pending application Serial No. 298,464, filed October 7, 1939.

An object of my invention is to provide an extracting process which is simple, efficient in operation, and which will produce an extracted juice wherein the vitamin and flavor contents are retained after canning for a considerable period of time.

Another object of the invention is to provide an apparatus which is simple to construct, easy to repair and replace, and which prevents access of oxygen to the extracted juices at any point in the process.

A further object of the invention is to provide an input or delivery conveyor which is simple in construction, and which is completely efficient in barring the access of oxygen to the extraction chamber.

Yet another object of the invention is to provide a conveyor which will center the fruit delivered so that it will be delivered in the proper position for action of the cutting knives in the extraction chamber.

Still another object of the invention is to provide an output conveyor which is simple in construction, positive in operation, and which will prevent access of oxygen to the juice in the extracting chamber.

Further objects are to provide efficient processes for extraction of juice from vegetables and fruits, such as citrous fruits, and also for filling cans and other containers with these juices so that objectionable oxidation of the juices is prevented.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 represents my apparatus in side elevation, some of the parts being shown in dotted lines to more clearly indicate the construction;

Fig. 2 is a detail longitudinal sectional view taken through the lower part of the elevating conveyor;

Fig. 3 is a view taken along the line 3—3 of Fig. 2, looking in the direction of the arrows;

Fig. 4 is a view taken along the line 4—4 of Fig. 2, looking in the direction of the arrows;

Fig. 5 is a longitudinal sectional view showing the construction at the upper end of the elevating conveyor;

Fig. 6 is a view taken along the line 6—6 of Fig. 5 looking in the direction of the arrows;

Fig. 7 is a view taken along the line 7—7 of Fig. 5, looking in the direction of the arrows;

Fig. 8 is a view taken along the line 8—8 of Fig. 2, looking in the direction of the arrows;

Fig. 9 is a view taken along the line 9—9 of Fig. 2, looking in the direction of the arrows;

Fig. 10 is a view taken along the line 10—10 of Fig. 1, looking in the direction of the arrows;

Fig. 11 is a view taken along the line 11—11 of Fig. 1, looking in the direction of the arrows;

Fig. 12 is a detail sectional view showing the peel discharge chute with the removable closure in place;

Fig. 13 is a detail sectional view showing the peel discharge conveyor, some of the parts being broken away to more clearly indicate the construction;

Fig. 14 is a view taken along the line 14—14 of Fig. 13, looking in the direction of the arrows;

Fig. 15 is a flow sheet illustrating my filling process.

Referring to the drawings, I have shown an apparatus comprising an input elevating conveyor A, an extracting mechanism B, and a peel discharge mechanism C. The input elevating conveyor A comprises two substantially parallel tubes 1 and 2. Through these tubes is adapted to pass a flexible endless conveyor 3 which may be of any desired type. I have shown in the drawings that the conveyor is of the endless type and comprises two sprocket chains 4 and 5. The conveyor tubes 1 and 2 are joined at their lower ends by a return section of tubing 6 which is suitably attached, as indicated at 8, to the tubes 1 and 2.

At its upper end the tube 2 passes into a chamber 9 which projects downwardly from the tube 2.

The chamber 9 is joined, as indicated at 10, to a downward extension 11 of the tube 1.

The chains 4 and 5 of the endless conveyor 3 pass over a sprocket 12 in the return section 8 of the conveyor tube. They also pass over sprockets 13 mounted in the section 11 of the tube 1, thence pass downwardly over sprockets 14 located in the extension 9 of the tube. From thence the conveyor passes over a sprocket construction 15.

The tube 1 is provided with an assembly hatch 16 and a hopper or feeding hatch 17. The tube 2 is provided with a discharge chute 18 which is adapted to discharge into the extracting mechanism indicated generally by the letter B. It also has an assembly hatch 19. The chamber 9 is provided with an assembly hatch 20. The conveyor can be tightened by the usual screw-tightening construction, indicated generally by the numeral 21, which is adapted to move the sprocket mechanism 13 either in an upward or downward direction to tighten the sprocket chains 4 and 5 of the conveyor.

The conveyor 3 is driven by means of the sprocket 14' through a chain drive 22 which passes over a drive sprocket 23 carried by a counter shaft 24 driven by a drive pulley 24', which in turn is driven by a belt drive 25 from a source of power (not shown).

The conveyor chains 4 and 5 carry, at spaced intervals, conveyor flights 26 which comprise slats 27 which carry upstanding fingers 28. Each slat 27 carries three pairs of the upstanding fingers 28. Each pair of fingers 28 comprises two fingers which are slanted inwardly towards each other so that the orange or other round object will be forced into a centered position within the fingers. This is important as it enables the oranges to be held in a proper position for proper feeding into the extracting mechanism. The cutting knives and the extracting mechanism in the extracting chamber are not shown, they may be of any of several known types on the market, such as the so-called Faulds rotary juice extractor. This construction forms no part of the present invention.

The slats 27 for the conveyor flights are adapted to slide on tracks 30 in their movement through the conveyor housing comprising the two tubes 1 and 2.

As has been indicated, there are three sets of pairs of fingers which operate to hold the fruit in its passage on the conveyor. This arrangement is for the purpose of delivering three columns of fruit into the extracting chamber B. There are partitions 31 which divide the interior of the conveyor into three compartments. The fruit is delivered in the delivery hopper 17 in tube 1 by means of a chute 32 to which fruit is fed by a conveyor, indicated generally by the numeral 33, driven in synchronism with the conveyor 3 by a drive chain 34, which in turn is driven by a sprocket member 35 mounted on a shaft 36, which carries the sprockets 12. Thus the fruit delivered through the hopper 17 falls into the three rows above described, and occupies a position on the fingers 28 such as is indicated in Figure 8.

The motion of the conveyor is as indicated by arrows in Fig. 1, and the fruit falls into a liquid gas seal 37 formed by water lying in the lower end of the conveyor A (see Figs. 1 and 2). The fruit rests on the pairs of fingers 28 in the position indicated in the top row in Figs. 2 and 8, until the fruit passes into the water seal 37, where it is carried through by the conveyor 3, as indicated in Fig. 2. After passing through the seal it is picked up by the pairs of fingers 28 and from then on occupies a position in the angle formed by the fingers 28, as indicated in Fig. 2, and in dotted lines in Fig. 9.

The fruit passes from the input chute 17 down the tube 1, through the return section 8 up through the tube 2, and is delivered into input chute 18 which delivers into the extracting section B of the mechanism. In Fig. 9 I have indicated the fruit leaving the fingers (see top row) and passing into trough sections 38 within the delivery chute 18. From thence, as previously described, the fruit passes to the cutting knives and to the extracting mechanism, which is not shown and which lies within the extracting section B of the mechanism. This extracting mechanism is driven by operating gears 39, indicated in dotted lines in Fig. 1, which are in turn driven by a gear wheel 40, shown partially in dotted lines, which is driven by a sprocket 41 through a chain 42 which passes over a sprocket 41' on the countershaft 24.

The arrangement is such in the delivery conveyor construction, indicated generally by the numeral A, that when the assembly hatches 16, 19 and 20 are closed, the input hopper 17 closed by a closure plate 43 which can be bolted in place, then the whole input conveyor assembly can be filled with water or inert gas, as will be later described.

The extracting section B of the mechanism is likewise liquid and gas-tight. The section 9 which projects downwardly from the conveyor tubing 2 provides a liquid seal 44, as indicated in Figs. 5 and 1. The liquid seal 37 at the lower end of the input conveyor A has a water inlet pipe 45 and a water outlet pipe 46 with suitable valves therein (not shown). The liquid seal 44 has a water outlet pipe 47, and a water inlet pipe 48.

Leading outwardly and downwardly from the extracting section B of my device are peel discharge chutes 50, in the sides of which are clean out hatches 51. Each chute 50 has a delivery end 52 which is adapted to lie below the water level 53 in vats 54 (see Fig. 14). Each vat 54 is connected at its side 55 with a trough construction 56 in which are adapted to travel flights 57 of the output conveyor mechanism C.

By having the delivery chutes deliver the peels from the extracting chamber B below water or liquid level, access of oxygen to the extracting mechanism and the extracted juices is prevented. The whole mechanism is adapted to be filled with inert gas, such as carbon dioxide or nitrogen, to prevent oxidation of the extracted juices at any time either during extraction or after extraction. The purpose of the construction is to prevent access of oxygen at any time to the juice from the disruption of the fruit until the juices are delivered and sealed in the containers.

In order to prevent clogging of the output end of the peel chutes 50, I have provided agitating means in the vats 54 to disturb the liquid adjacent the discharge ends of the chutes 50. The form of mechanism I have shown for accomplishing this agitation is indicated in Fig. 14 where I have shown an oscillating paddle member 58 mounted on a shaft 59 supported by the top of the vat 54. An operating arm 60 is pivoted at 61 to the paddle 58, and is driven through a reduction gear 63' by an eccentric cam construction, indicated generally by the numeral 62, which is mounted on a shaft 63 that is driven by a belt 64 from a pulley 65 which is mounted on a drive shaft 66. The drive shaft 66 derives its power through a sprocket 67 that is driven by a sprocket chain 68 which passes over a sprocket 68' on the counter-shaft 24.

The shaft 63 likewise drives a paddle 69 in the direction indicated by the arrow which moves the peels which are now floating on the water in this discharge liquid seal, indicated generally by the numeral 70, in towards the trough 56 so that the peels can be engaged by the conveyor flights 57 and discharged, as will later be indicated. The oscillation of the paddle 58 prevents clogging of the lower end of the peel discharge chute 52.

The conveyor flights 57 are moved on the flexible endless conveyor 71, which passes along upper guides 72 and lower guides 73.

The flexible conveyor 71 comprises two sprocket chain members 74, which pass over sprockets 75 mounted on a shaft 76 which is adjustable longitudinally by means of a screw-threaded adjusting mechanism 77, indicated generally. This mechanism enables the flexible conveyor 71 to be tightened. One end of the guides 72 and 73 are up-turned, as indicated in Fig. 13. The peels drop out along the discharge surface 78 of a discharge chute. The conveyor 71 is driven by means of sprocket drives 79, which are in turn driven by the sprocket 67 mounted on the shaft 66. The sprocket 67 is driven by the sprocket chain 68, as previously described.

Each of the discharge chutes 50 is adapted to have its lower end 52 enclosed by removable closure members 80 which are held in place by means of bolts 81 which pass through the closure members 80 and through flanges 82 formed on the lower end of the peel discharge chutes 50. This arrangement is such that water can be retained in the system prior to beginning the extracting operation, as will be later described. The removable closures 80 are adapted to be removed when the extracting operation proper has been commenced.

I have provided a gas inlet 100 controlled by a suitable valve (not shown) for introducing an inert gas into the interior of the input conveyor, the extracting mechanism B and the peel discharge chute. The extracting mechanism B is provided with a bottom which slopes towards the center, as indicated at 101, into which the juice is discharged through a collection pipe 102, from whence the juice may be taken to the filling operation for filling containers with the extracted juice.

In order to remove all of the oxygen in the apparatus at the start of the operation, I fill the interior of the apparatus with water. I close all of the assembly hatches and the input hatch 17 through which the oranges or other fruit or vegetables to be extracted are fed to the machine, and the discharge ends of the chutes 50. With all of these hatches closed, water can be introduced through the water inlet pipe 45 in the liquid seal 37, or through water inlet 48 in the liquid seal 44. It is to be understood that the valves in the outlet pipes 46 and 47 are closed to prevent egress of water or other fluid which may be used for the machine. Water is then allowed to flow into the apparatus and fill it. That is to say, the input conveyor A is filled with water; the downwardly projecting section 9 of the input conveyor is filled with water; the extracting section B is filled, and the peel output ducts 50 are filled. Likewise the vats 54 and the trough 56 are filled with water. Now the whole machine is filled with water and gas can be introduced through the gas line 100. This gas may be carbon dioxide, or nitrogen, or a mixture of both, or other suitable inert gas which will prevent oxidation of the extracted juice. Water is let out of the machine as the gas fills the machine. The liquid seals 37 and 44 at the upper and lower ends of the elevating conveyor are of course kept filled with liquid. Likewise the vats 54 and trough 56 are kept filled with water. Now the entire interior of the machine is filled with a non-oxidizing or inert gas. Closure plate 43 of the feeding hopper to the elevating conveyor is removed. The closure plates 80 for the bottom of each of the discharge chutes 50 are also removed.

Oranges, or other citrous fruit, are fed by the conveyor 33 into the chute 54 and into the input hopper 17 of the elevating conveyor A. All three of the sections of the elevating conveyor are filled, and the flights of the conveyor cause the fruit to pass down through the water seal 37, from whence they are conducted upwardly, as indicated by the arrow in Fig. 1, and three rows of fruit are dumped into the hopper 18 that feeds the slicing and juice extracting mechanism, the rows of fruit rolling downwardly in the troughs of sections 38 of the input hopper 18 to the cutting and extracting mechanism in section B of the machine. Each of the fruit is halved by cutting knives (not shown), and the juice is extracted by mechanism (not shown), the juice flowing to the sloping floor 101 of the extracting section B of the machine, from whence it can be allowed to flow out to fill receptacles.

In filling receptacles, it is generally desirable to fill the receptacle from the bottom up in order to prevent access of oxygen to the cans or other receptacles. The cans are treated with steam to heat them and fill them with steam, thereby displacing air. The cans are filled from the bottom and a layer of steam on the rising juice prevents access of oxygen to the juice. The filling process is illustrated in the flow sheet Fig. 15. The filling is slow enough to substantially prevent turbulence and therefore prevent any incorporation of air into the juice. This bottom filling and substantial prevention of turbulence I find of great importance. I subject the juice to pasteurizing temperatures prior to its introduction in the cans and may continue the pasteurizing temperature for a desirable length of time after the cans have been sealed, if desired. The particular form of pasteurization forms no part of the present disclosure.

This filling process is conducted so that the temperature of the steam, the temperature of the can, and the temperature of the citrous juice or other liquid introduced in the bottom of the can is such as to prevent any substantial condensation of the steam during the filling operation. Moreover, as explained above, there is a layer of steam on the surface of the rising juice in the can, which layer is not disturbed by the turbulence of the juice, and acts as a blanket or buffer to prevent access of the oxygen of the air to the juice.

The peels fall out of the extraction section B of the machine through discharge chutes 50, and are discharged through the ends 52 of the discharge chutes 50 under the surface of the water in the vats 54. The paddles 58 adjacent the discharge ends 52 of the discharge chutes 50 keep the peels from clogging by keeping the water in motion. The paddles 69 move the floating fruit peels from each of the vats 54 over into the trough 56. The flights 57 of the discharge conveyor C engage the fruit peels and discharge them over the sloping discharge chute surface 78 to a vat or another conveying trough, as desired.

It is to be noted that no oxygen can contact the fruit or the juice in its passage through the machine from the time the fruit enters through the liquid seal 37 of the elevating conveyor A until the extracting operation is completed. Access of oxygen is prevented through operation of the liquid seals 44 and 37 at the top and bottom of the elevating conveyor A, and likewise the liquid seals formed at the bottom of the peel discharge chutes 50 prevent access of oxygen into the extracting chamber B.

Further it will be observed that the peel discharge mechanism is efficient and easy of access for hand cleaning if necessary, and the peels are given constant motion as they go from the extracting section through the water seal and into the discharge conveyor, thus preventing their clogging.

Further the delivery conveyor mechanism forms not only a conveyor, but a water seal, the conveyor having water seals at both top and bottom. The conveyor itself comprises a double duct, one half of which is sealed from the atmosphere, the other half of which being open to the atmosphere. The flights on the conveyor belt and the conveyor construction are such as to center the fruits in position with respect to the cutting and squeezing mechanism. Different sizes of the fruit are held centered and thus the mechanism does not have to operate on a uniform size of fruit. It is to be noted that the duct sections 38 of the input duct 18 to the extracting mechanism B have a sloping bottom, which holds the fruits centered (see Fig. 9.)

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A method of extracting juice from citrus fruits comprising the steps of passing the whole fruit through a liquid seal into an atmosphere of inert gas, spacing the fruit in a plurality of columns, discharging the columns of spaced whole fruit into an extracting zone, and extracting the juice from the fruit in the atmosphere of inert gas to prevent oxidation of the juice.

2. A method of extracting juice from citrus fruits comprising the steps of passing the whole fruit through a liquid seal into a zone of inert gas, spacing the fruit in a plurality of columns, discharging the columns of spaced fruit into an extracting zone, extracting the juice from the fruit in the presence of inert gas to prevent oxidation of the juice, and discharging the peels through a liquid seal.

3. A method of extracting juice from citrus fruit comprising the steps of passing the whole fruit through a liquid seal into a zone of inert gas, spacing the fruit in a plurality of columns, discharging the columns of spaced fruit into an extracting zone, extracting the juice from the fruit in the extracting zone in the presence of an inert gas to prevent access of oxygen to the juice, discharging the peels from the extracting zone through a liquid seal, and introducing the extracted juice into a container under non-oxidizing conditions.

4. A method of extracting juice from citrus fruits comprising the steps of passing the whole fruit through a liquid seal into a zone of inert gas, spacing the fruit in a plurality of columns, discharging the columns of spaced fruit into an extracting zone, extracting the juice from the fruit in the presence of inert gas to prevent oxidation of the juice, and discharging the peels through a liquid seal while agitating the liquid in the discharge seal and thereby inhibit clogging of said discharge seal by the peels.

RONALD B. McKINNIS.